United States Patent [19]
Ducret

[11] Patent Number: 5,806,187
[45] Date of Patent: *Sep. 15, 1998

[54] CLAMPING DEVICE

[76] Inventor: Lucien C. Ducret, 9 Tod's Driftway, Old Greenwich, Conn. 06870

[*] Notice: The term of this patent shall not extend beyond the expiration date of Pat. No. 5,611,146.

[21] Appl. No.: 747,850

[22] Filed: Nov. 13, 1996

Related U.S. Application Data

[63] Continuation-in-part of Ser. No. 548,279, Oct. 25, 1995, Pat. No. 5,611,146.
[51] Int. Cl.$^6$ .............................. B23D 49/11; B23D 49/16
[52] U.S. Cl. .................................. 30/92; 30/371; 269/239
[58] Field of Search .............................. 30/92, 90.2, 289, 30/378, 371, 101; 269/182, 239, 902, 3, 156, 174

[56] References Cited

U.S. PATENT DOCUMENTS

| | | |
|---|---|---|
| 169,027 | 10/1875 | Naumann . |
| 1,111,388 | 9/1914 | Johnson . |
| 1,505,205 | 8/1924 | Kilgour . |
| 2,227,844 | 1/1941 | Roche . |
| 2,329,729 | 9/1943 | Saucke . |
| 2,342,322 | 2/1944 | Ailstock . |
| 2,937,440 | 5/1960 | Kelly ..................................... 30/101 X |
| 3,284,895 | 11/1966 | Selander et al. . |
| 3,834,019 | 9/1974 | Smeltzer et al. . |
| 4,349,928 | 9/1982 | Mlikotin . |
| 4,437,237 | 3/1984 | Ducret . |
| 4,796,877 | 1/1989 | Musil et al. . |
| 4,821,414 | 4/1989 | Ducret . |

*Primary Examiner*—Douglas D. Watts
*Attorney, Agent, or Firm*—St. Onge Steward Johnston & Reens LLC

[57] ABSTRACT

A removable attachment for use with a hand-held tool is disclosed. The tool comprises a housing and a cutting blade mounted therein for continuous reciprocating movement during operation. The attachment comprises a work piece receiving member pivotally mounted to the tool housing. An adjustable clamping member is pivotally mounted to the work piece receiving member. An adjuster, movable between an engaged and a disengaged position, is operably connected to the clamping member for adjusting the clamping member so as to clamp a work piece positioned on the work piece receiving member for operation thereon by the cutting blade. A quick release mechanism is provided for quickly moving the adjuster between its engaged and disengaged positions. In one preferred embodiment, the quick release mechanism comprises a rotatable cam operatively connected with a sliding member; rotation of the cam causes the sliding member to move from the first position to the second position thereby causing the sliding member to move the adjuster into the engaged position. In the engaged position, the adjuster is operably connected to the clamping member, and in the disengaged position, the clamping member and the adjuster are freely movable allowing the operator to quickly position a work piece in the clamp or remove a cut work piece.

16 Claims, 6 Drawing Sheets

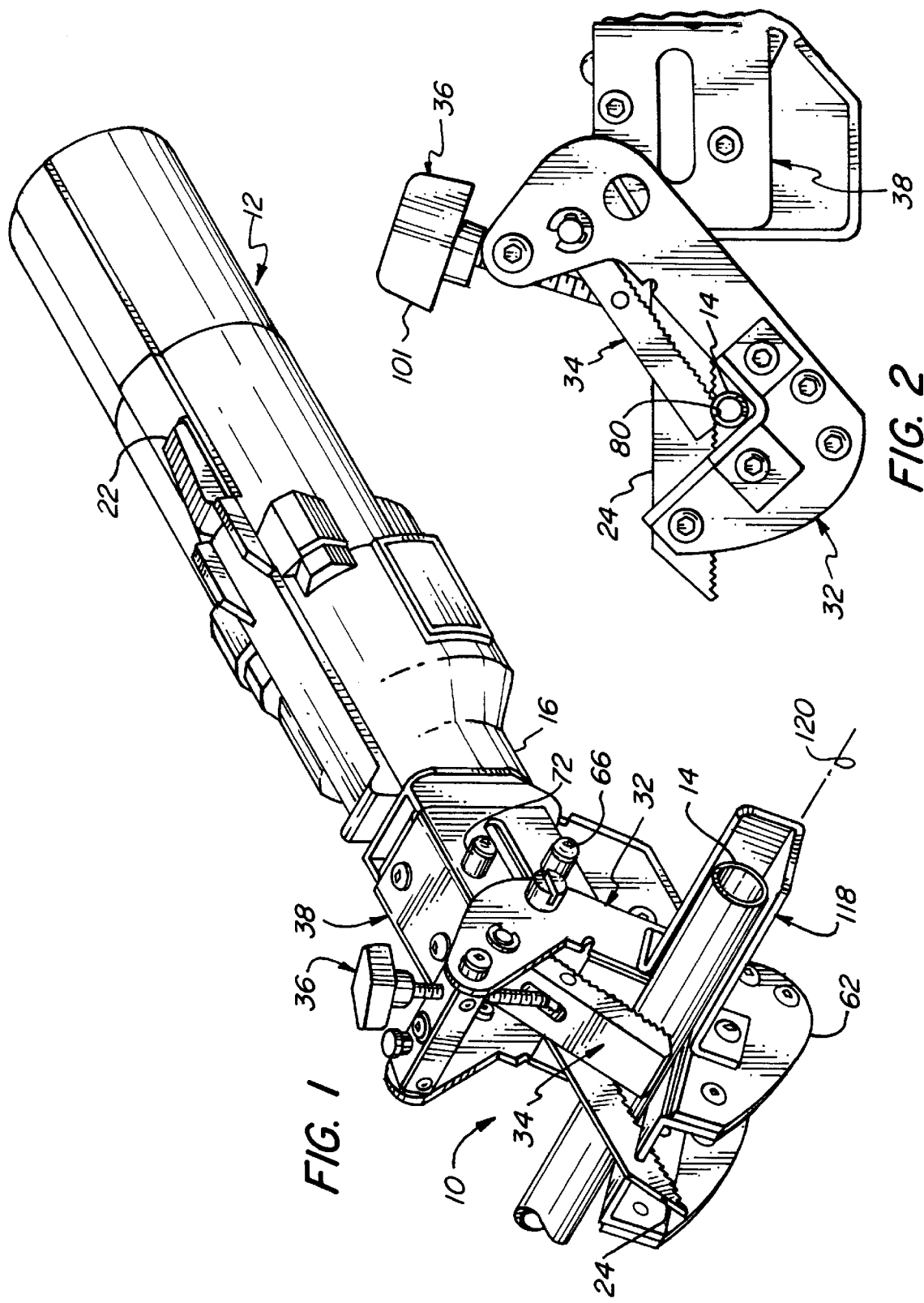

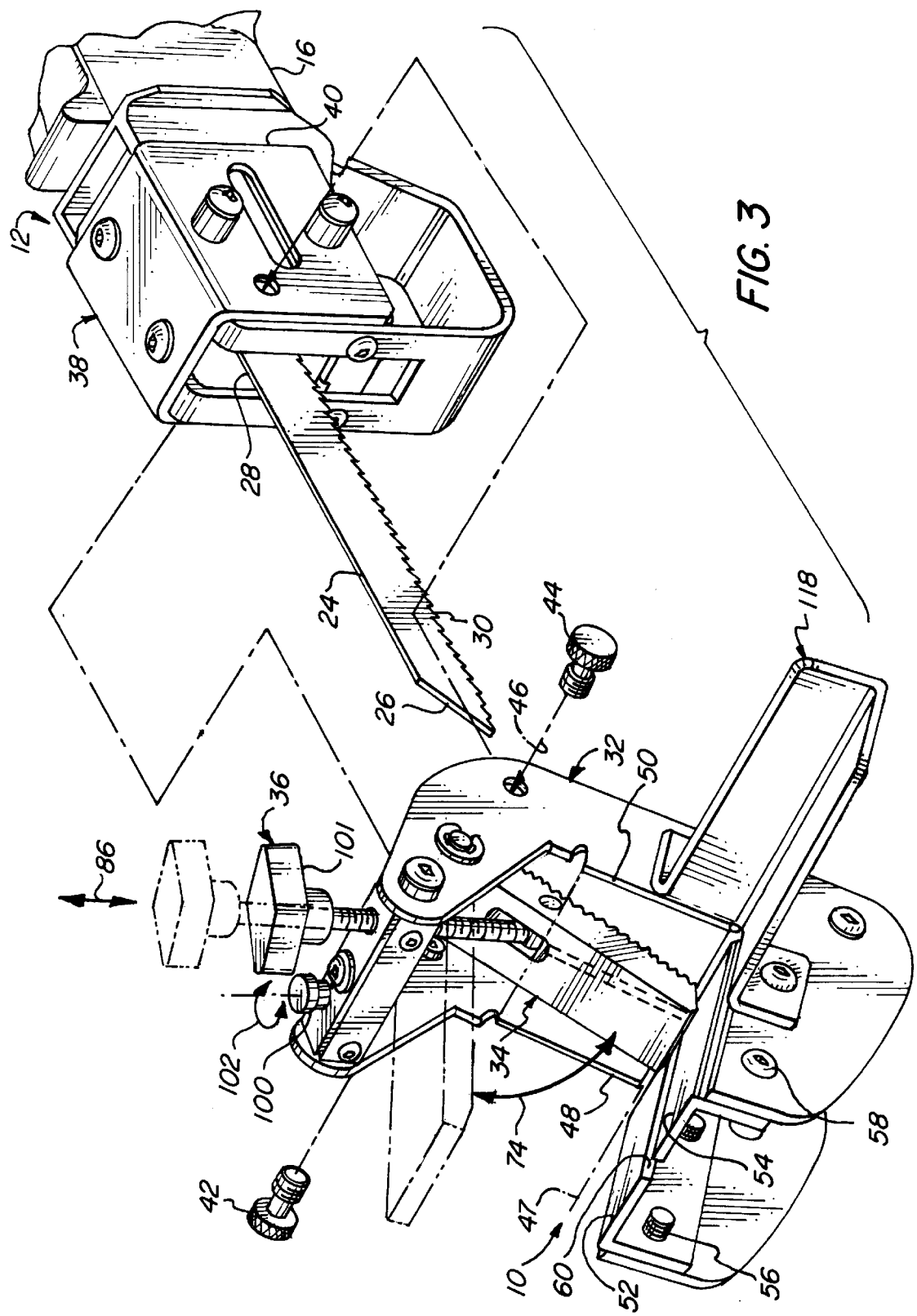

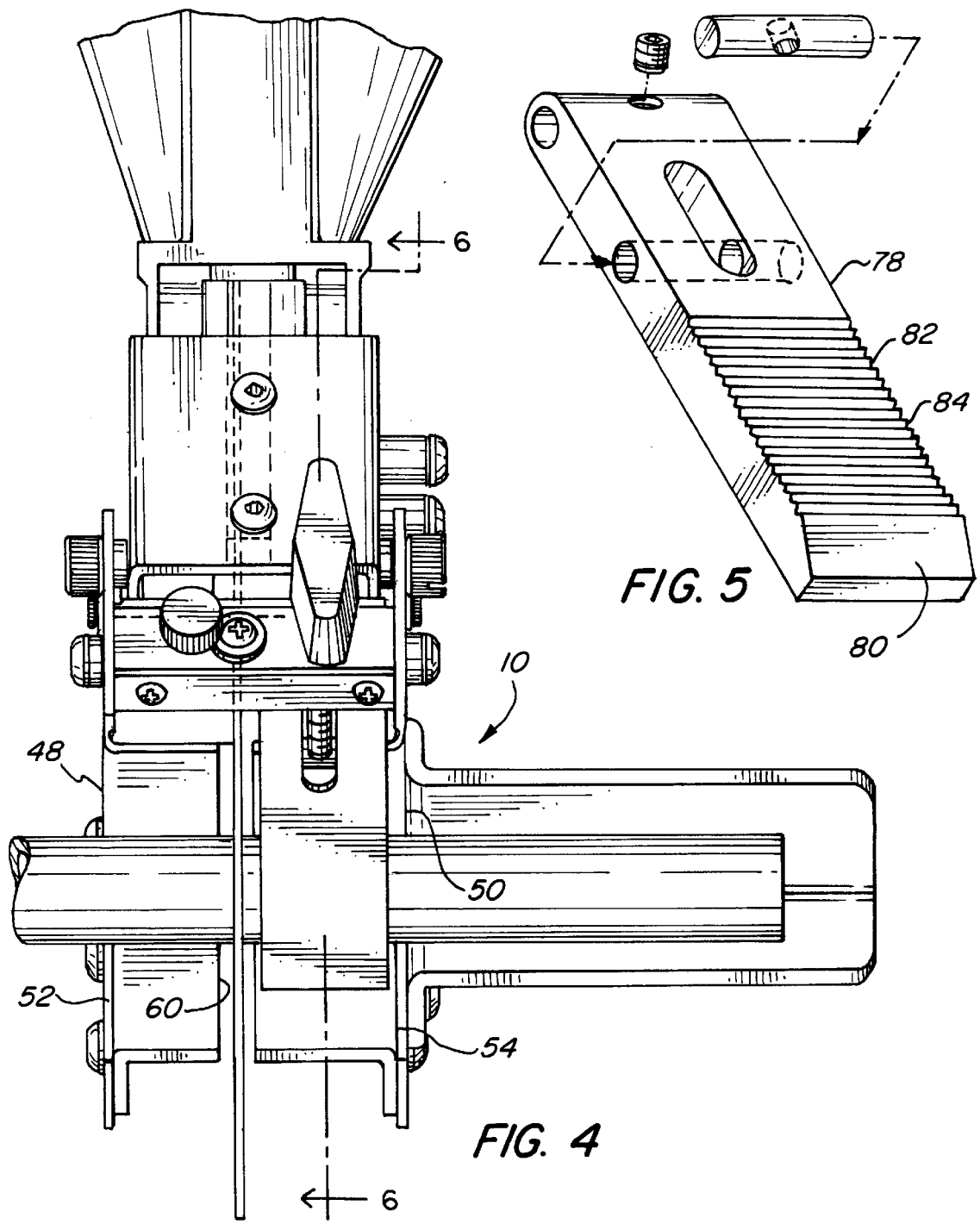

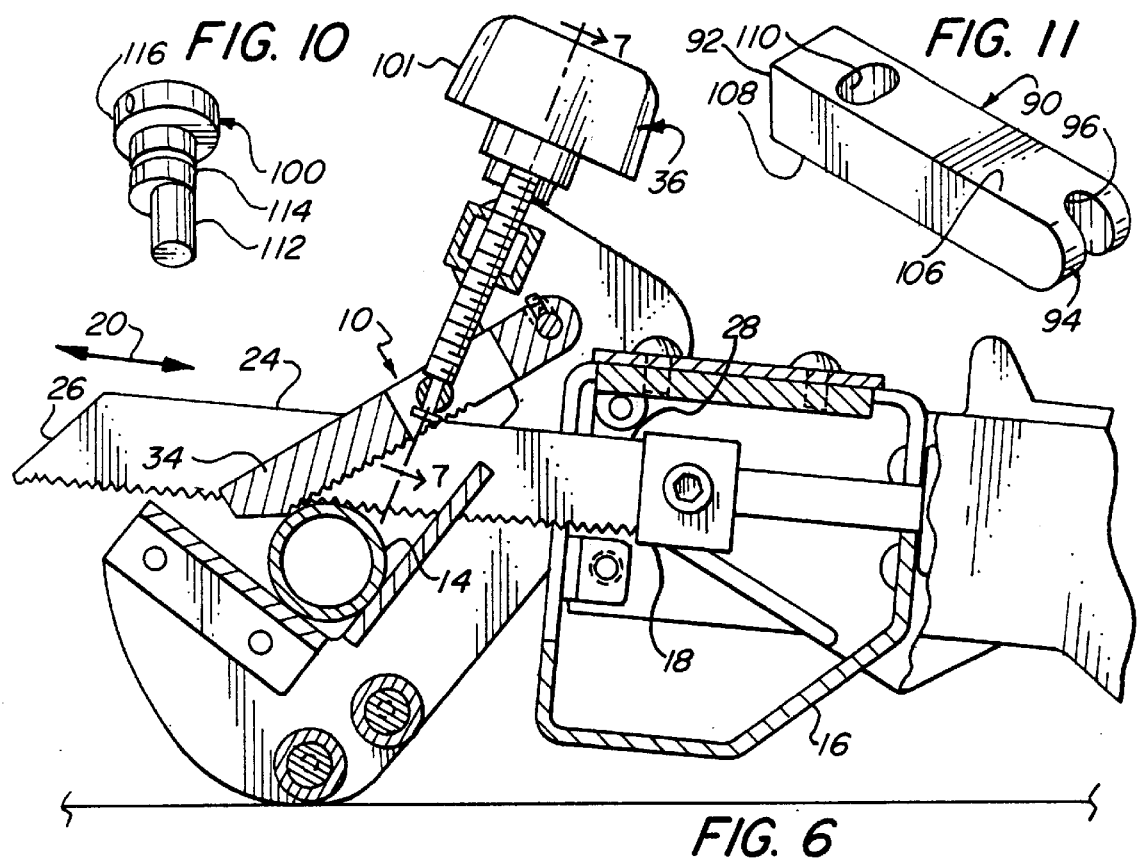
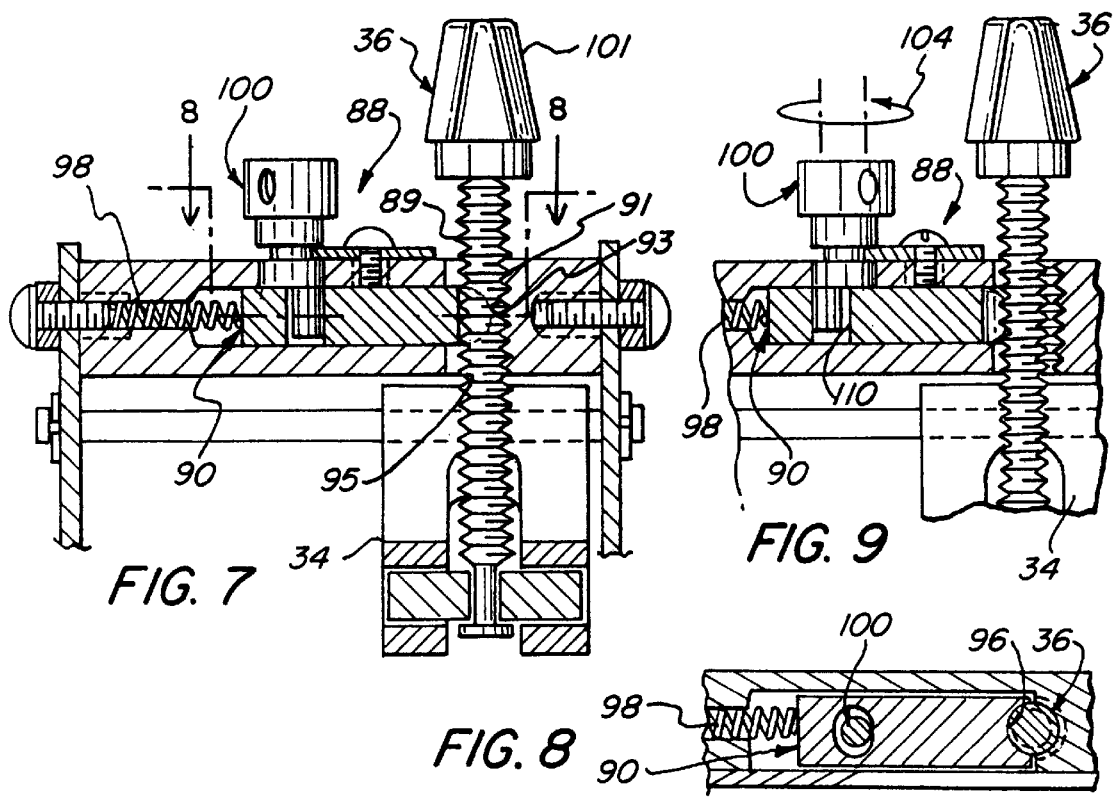

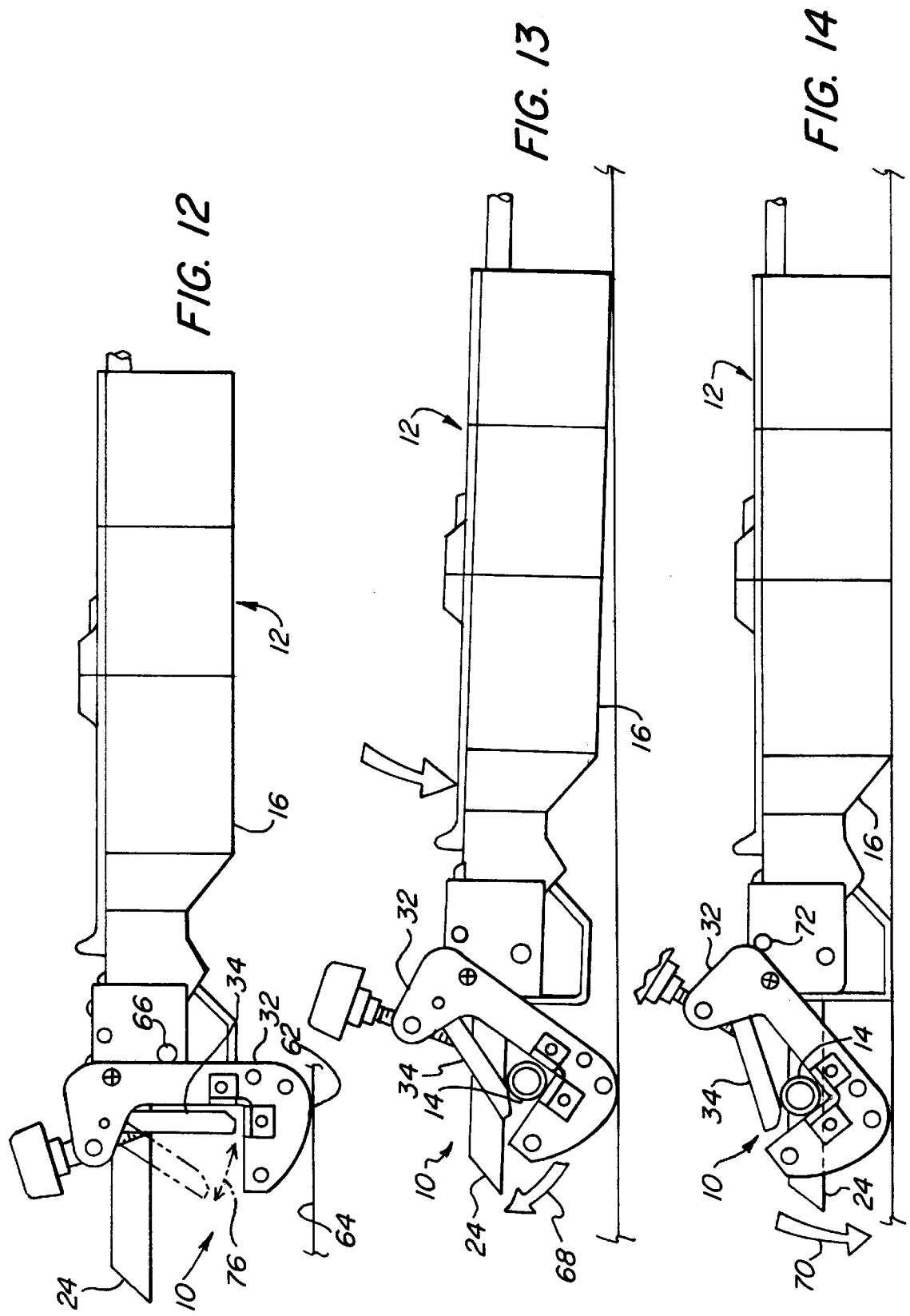

CLAMPING DEVICE

CROSS REFERENCE TO RELATED APPLICATION

The present application is a continuation-in-part of an application now pending entitled, "Clamping Device for Use with a Hand-Held Tool," which was filed on Oct, 25, 1995 and accorded Ser. No. 08/548,279, now U.S. Pat. No. 5,611,146.

FIELD OF THE INVENTION

The present invention relates to a clamping device for use with a hand-held tool. More particularly, the present invention relates to a clamping device for facilitating the positioning of a work piece, such as a pipe, conduit or the like, with respect to the tool to effect operation on the work piece by the tool.

BACKGROUND OF THE INVENTION

Clamping devices which are removably attached to a power tool housing are known. One such clamping device is shown in U.S. Pat. No. 3,834,019 to Smeltzer et al. The Smeltzer et al. patent describes an attachment having a tube engaging structure pivotally mounted to the tool housing. The tube engaging structure is movable between a tube receiving position and a cutting cycle completion position. In operation, a user engages the handle and moves the tube engaging structure into the tube receiving position. After a tube is inserted into the tube engaging structure, the user releases the handle. A spring, connected to the tube engaging structure, biases the tube engaging structure towards the cutting blade so that the tube is "clamped" between the tube engaging structure and the cutting blade. After the tube has been cut, it is no longer "clamped" and the two portions of the tube fall to either the side of the attachment.

Another clamping device for use with a hand-held tool is shown in U.S. Pat. No. 4,437,237 to Ducret (the '273 patent), who is also the named inventor of the present invention. The '237 patent discloses a removable clamping device comprising a work holding assembly having pivotally mounted side plates, best shown in FIG. 11 of the '273 patent. The plates extend downwardly and forwardly and carry an adjustable lower jaw. A nut/bolt combination is provided for manually moving the lower jaw to the appropriate location along the plates so as to clamp a work piece therein.

More specifically, the movable member of clamping jaw of the '237 patent is underneath the work piece; thus, the movable jaw member receives much of the force exerted on the work piece by the cutting blade and the user. Therefore, if the jaw member is not securely locked, it could slip from its position. In addition, the clamping member of the '237 patent must be manually tightened and loosened each time the operator desires to cut a work piece or release a work piece that has been cut. Further, the adjustable clamping member of the '237 patent is positioned under the cutting blade.

What is desired, therefore, is a clamping device which has an immovable portion of the clamping device bearing most of the force of the work piece and the user during the cutting cycle, which has a quick release mechanism to reduce the amount of time needed by the operator to clamp a work piece and/or remove a cut work piece, which is easily removed from and attached to a power tool housing, which can be attached to the power tool housing with little retooling, and which securely clamps work pieces of a variety of diameters.

SUMMARY OF THE INVENTION

Accordingly, it is an object of the present invention to provide a clamping device which can be easily attached to and detached from an existing hand-held tool.

It is another object of the present invention to provide a clamping device which can be attached to the housing of an existing hand-held power tool with little retooling.

It is still another object of the present invention to provide a clamping device which is simple in construction, efficient in operation and economical to manufacture and maintain.

It is still a further object of the present invention to provide a clamping device wherein the adjustable portion of the clamping member is not a weight-bearing member of the clamping device.

It is yet a further object of the present invention to provide a clamping device wherein the clamping member can be adjusted at a location wherein the user is not exposed to harm while adjusting the clamping device.

It is still another object of the present invention to provide a clamping device wherein the clamping member is suitable for clamping work pieces having a variety of diameters, including relatively small diameters.

It is still a further object of the present invention to provide a clamping device which has a quick release mechanism to reduce the amount of time needed by the operator to clamp a work piece and/or remove a cut work piece from the device.

To overcome the deficiencies of the prior art and to achieve the objects and advantages listed above, a clamping device is disclosed which comprises a mounting assembly which comprises a work piece receiving member having a longitudinal axis and at least one work piece receiving surface, an adjustable clamping member pivotally mounted to the work piece receiving member, an adjuster for adjusting the clamping member so as to securely position a work piece between the clamping member and the work piece receiving surface, and a mounting assembly for removably attaching the clamping device to a hand-held tool.

The adjustable clamping member is pivotally mounted to the work piece receiving member about a pivotal axis positioned substantially parallel to the longitudinal axis of the work piece receiving member. The adjuster is movable between an engaged and a disengaged position and is connected to the clamping member such that when the adjuster is in the engaged position, the clamping member facilitates positioning of the work piece on the work piece receiving member.

A quick release mechanism minimizes the amount of the time an operator must spend clamping a work piece to be cut and/or removing a work piece from the work piece receiving member after it has been cut. In one preferred embodiment, the quick release mechanism comprises a sliding member operatively connected to the adjuster and movable between a first position and a second position, and a rotatable cam, operatively connected to the sliding member, for moving sliding member between the first and second positions. Rotation of the cam causes the sliding member to move from the first, or disengaged, position to the second position, or engaged position, thereby causing the sliding member to move the adjuster into the engaged position.

In the engaged position, at least some of the threads of the adjuster engage a threaded portion of the clamping device housing adjacent the adjuster. As such, an operator may rotate the adjuster and move the clamping member in the preferred direction, i.e., either towards or away from the work piece positioned on the work piece receiving member.

In contrast, in the first position, the adjuster is freely movable in a direction substantially perpendicular to the longitudinal axis of the work piece receiving member. When the adjuster is freely movable, it may be quickly and easily pivoted to facilitate positioning a work piece on or removing it from the work piece receiving member. Thus, the quick-release member is a time and energy saving feature of the present application.

In another preferred embodiment, the quick release mechanism is not cam activated; rather, the adjuster is moved between the engaged and the disengaged position by an adjuster engaging member which is movable toward and away from the adjuster via threads circumferentially positioned about the adjuster engaging member. The housing of the clamping device has a complimentary threaded portion to facilitate movement of the adjuster engaging member.

After the clamping member securely positions the work piece against the surface of the work piece receiving member, the work piece can be quickly and easily cut in a plane transverse to the length of the piece, or otherwise acted on. Thus, the clamping device provides means for positioning the work piece so that it may be cut in a substantially "straight" manner; accordingly, the clamping device facilitates positioning the work piece in a much more secure manner when compared to conventional clamping devices.

The invention and its particular features and advantages will become more apparent from the following detailed description when considered with reference to the accompanying drawings.

BRIEF DESCRIPTION OF THE DRAWINGS

FIG. 1 is an isometric view of a hand-held tool and an attached clamping device constructed in accordance with the present invention, wherein the clamping device is shown clamping a work piece having a relatively large diameter;

FIG. 2 is a side view of the clamping device shown in FIG. 1, showing a beveled edge of a clamping member advantageous for clamping a work piece having a smaller diameter than the work piece shown in FIG. 1;

FIG. 3 is an exploded view of the hand-held tool and the clamping device shown in FIG. 1 (with the work piece removed for clarity);

FIG. 4 is a top view of the hand-held tool and the clamping device shown in FIG. 1;

FIG. 5 is an exploded view of the bottom portion of the clamping member shown in FIGS. 1–4;

FIG. 6 is a cross-sectional view of the hand-held tool and attached clamping device taken along line 6—6 of FIG. 4;

FIG. 7 is a cross-sectional view of the clamping device taken along line 7—7 of FIG. 6, showing a cam and sliding member engaged with an adjuster;

FIG. 8 is a cross-sectional view taken along line 8—8 of FIG. 7 showing the cam and sliding member in the engaged position;

FIG. 9 is a view similar to that shown in FIG. 7, except the cam and sliding member are in the disengaged position, i.e., the threaded adjuster is not operably positioned against the corresponding threaded portion;

FIG. 10 is an enlarged view of the cam;

FIG. 11 is an enlarged view of the sliding member;

FIGS. 12–14 are schematic side views showing the various positions of the clamping device relative to the position of the hand-held tool when in operation;

DETAILED DESCRIPTION OF THE DRAWINGS

Figure 15:
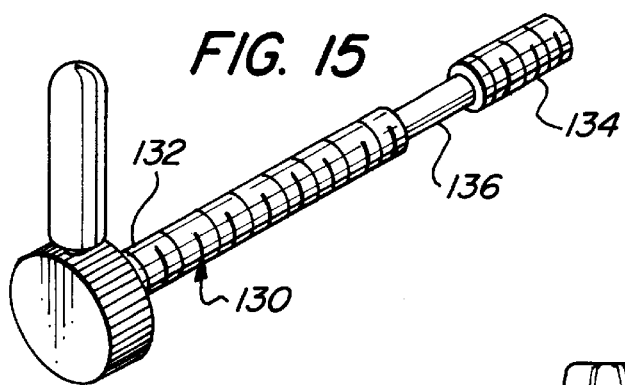
FIG. 15 is an isometric view of an adjuster engaging member for use in another preferred embodiment of a quick release mechanism.

Referring to the drawings in detail, a clamping device is shown and generally designated by the reference numeral 10. It should be understood that for the sake of clarity not all of the components and parts of clamping device 10 may be shown and/or marked in all the drawings. Further, as used herein, the terms "up", "down", "top", "bottom", etc. refer to clamping device 10 when in the orientation shown in FIG. 1.

As best shown in FIG. 1, clamping device 10 of the present invention can be operably connected to any suitable device, such as a power-operated, hand-held, reciprocating saber saw, generally indicated at 12, such as that one manufactured by the Porter Cable Company, marketed under the trademark TIGER CUB, for cutting through a work piece 14. Other suitable devices include power-operated saws other than saber saws. Clamping device 10 has been shown for use with power-operated, hand-held saber saw 12 for convenience only; the present invention 10 is not limited to this application.

Tool 12, as shown in FIGS. 1, 6, comprises a housing 16 having a blade receiving member 18 mounted therein for continuous reciprocating movement in the directions shown by arrow 20 during the power operation of tool 12. It should be understood that tool 12 includes a suitable operably connected motor (not shown) within housing 16 which, through the usual power transmission (not shown), serves to impart continuous reciprocating movement to blade receiving member 18 in response to the engagement of actuating switch 22 by an operator.

Tool 12 also comprises a conventional cutting blade, generally indicated at 24, including a free end 26 and a remote end 28. Remote end 28 is adapted to be fixedly attached to the outwardly extending end of blade receiving member 18, by any suitable means (not shown) which means are known by persons skilled in the art. Blade 24 comprises a series of cutting teeth such as 30 (FIG. 3) extending along one longitudinal edge thereof between ends 26 and 28. In accordance with conventional practice, cutting teeth 30 are shaped so as to effect a cutting action during the reciprocating movement thereof in one direction. In the embodiment shown, cutting teeth 30 are shaped to provide a cutting action during the movement of blade 24 in a direction inwardly toward housing 16 of tool 12.

As illustrated in FIGS. 1–3, tool 12 is suitable for cutting work piece 14 in a plane parallel to the reciprocating movement of cutting blade receiving member 16 as indicated by arrow 20 (FIG. 6). It should be understood that clamping device 10 is suitable for clamping any of a variety of work pieces, such as pipes, conduits, tubes and the like, of various diameters. Clamping device 10 has been shown for use with a pipe for convenience only; the present invention 10 is not limited to this application.

Clamping device 10 functions to facilitate the positioning of work piece 14 in operative relation to the cutting blade 24 and the cutting movement of blade 24 of tool 12. As best shown in FIGS. 1–3, clamping device 10 comprises work piece receiving member 32, clamping member 34, adjuster 36 and mounting assembly 38.

Mounting assembly 38 detachably fixedly secures clamping device 10 to housing 16 of tool 12. As illustrated in FIGS. 12–14, mounting assembly 38 mounts clamping device 10 for pivotable movement between a plurality of positions, which are discussed more fully herein below. Any suitable mounting assembly may be used, mounting assembly 38 illustrated in the drawings being preferred. Preferably, mounting assembly 38, as shown in FIG. 3, comprises bracket 40 which fits snugly over tool housing 16. Adjustable threaded screws 42, 44, positioned on opposite sides of cutting blade 24, removably fixedly attach clamping device 10 to bracket 40 such that work piece receiving member 32 is pivotally connected to mounting assembly 38 and thus to tool housing 16 and such that cutting blade 24 is operatively positioned relative to work piece receiving member 32 and work piece 14 to effect cutting of work piece 14 positioned thereon. See FIG. 3.

Work piece receiving member 32 is pivotally mounted to tool housing 16 about a pivotal axis 46 (FIG. 3) extending substantially perpendicularly to the direction of reciprocating movement of blade receiving member 18 as indicated by arrow 20 (FIG. 6). Work piece receiving member 32 is pivotally mounted so as to move between a work piece receiving position (FIG. 12), to a work piece cutting cycle beginning position (FIG. 13), through a work piece cutting cycle completion position (FIG. 14).

Work piece receiving member 32 may be of any desired configuration suitable to receive and hold a work piece 14. In the preferred embodiment illustrated in the drawings, the structure comprises at least one, and preferably two, upper receiving surfaces 48, 50 and two lower receiving surfaces 52, 54 positioned with respect to each other so as to receive and hold work piece 14 positioned thereon. See FIGS. 1–3. In the most preferred embodiment, upper work piece receiving surfaces 48, 50 are positioned at approximately a right angle with respect to lower work piece receiving surfaces 52, 54. It should be understood, however, that work piece receiving surfaces 48, 50, 52, 54 can be positioned in any relationship to each other so long as they suitably receive and hold a work piece during the work piece receiving position through the work piece cutting cycle completion position.

Work piece receiving surfaces 48, 50, 52, 54 can be mounted with respect to the work piece receiving member 32 in any suitable manner by any suitable means. In the preferred embodiment, upper work piece receiving surfaces 48, 50 are integrally attached to work piece receiving member 32, while lower work piece receiving surfaces 52, 54 are removably fixedly attached to the work piece receiving member 32 via screws 56, 58, shown in FIG. 3.

Referring to FIG. 4, upper receiving surfaces 48, 50 are positioned with respect to each other and lower receiving surfaces 52, 54 are positioned with respect to each other such that a slot 60 extends at least partially therethrough, and preferably extends completely between surfaces 48, 50, 52, 54. Slot 60 is positioned, sized and shaped so as to allow the passage of reciprocating blade 24 at least partially through receiving surfaces 48, 50, 52, 54. Slot 60 is open in a direction toward cutting teeth 30 and free end 26 of blade 24 when work piece receiving member 32 is disposed in its work piece cutting cycle completion, for example, which is shown in FIG. 14.

In the work piece receiving position, illustrated in FIG. 12, work piece receiving member 32 is positioned such that cutting blade 24 is maximally displaced from the lower work piece receiving surfaces 52, 54 (best shown in FIG. 3) so as to facilitate the positioning of a work piece 14 (FIG. 1) thereon. Although any suitable position can be assumed, the preferred position is that shown. In the work piece receiving position, undesirable excessive rearward movement of the work piece receiving member, i.e., movement of work piece receiving member 32 away from the cutting blade 24, is prevented by stop member 66. Stop member 66 may be any suitable device sufficient to prevent undesirable movement of the work piece receiving member 32 as shown in FIG. 12.

Work piece receiving member 32 is movable from the work piece receiving position (FIG. 12) to the work piece beginning cutting cycle position (FIG. 13) in the direction shown by arrow 68 (also shown in FIG. 13). Advantageously, bottom portion 62 of work piece receiving member 32 is rounded to facilitate rotation thereof. In the work piece beginning cutting cycle position, work piece receiving member 32 is rotated towards cutting blade 24 and rotational movement of the work piece receiving member 32 is stopped when cutting blade 24 contacts work piece 14.

After cutting blade 24 cuts through work piece 14 (in the direction of arrow 70) in a plane substantially parallel with the direction of the reciprocating movement of cutting blade 24, undesirable, excessive rotational movement of work piece receiving member 32 is prevented by stop member 72 shown in FIG. 14. Work piece receiving member 32 is then in the work piece cutting cycle completion position.

Adjustable clamping member 34 is pivotally mounted to work piece receiving member 32 about a pivotal axis extending substantially perpendicularly to the direction of the reciprocating movement of the blade receiving member 16 shown by arrow 20 (FIG. 6), or, in other words, substantially parallel to the longitudinal axis 47 of work piece receiving member 32 (FIG. 3). Clamping member 34 is pivotable between a variety of positions as indicated by arrow 74 shown in FIG. 3 and arrow 76 shown in FIG. 12.

Referring in detail to FIGS. 2, 5, clamping member 34 further comprises bottom portion 78 suitable to facilitate clamping pipes having a variety of diameters. Compare FIGS. 1 and 2. Preferably, bottom portion 78 has beveled edge 80 (FIG. 5) for facilitating the clamping of a work piece 14 having a relatively small diameter. In the preferred embodiment, the placement and length of the beveled edge is such that it is possible to clamp a work piece 14 having a diameter as small as one-eighth of an inch.

Referring again to FIG. 5, bottom portion 78 of clamping member 34 further comprises a plurality of grooves, such as 82, 84, for creating a relatively non-slip surface on bottom portion 78 for facilitating positioning of work piece 14. The grooves illustrated in the drawings are substantially parallel to each other and are positioned relatively close to each other, such as about 15–35 grooves per inch, or most preferably about 20–25 grooves per inch. Most preferably, grooves 82, 84 are positioned such that they are parallel to the longitudinal axis 47 of the work piece receiving member 32 (FIG. 3), or, in other words, substantially perpendicular to the direction of the reciprocating movement of the blade receiving member 16, as indicated by arrow 20 in FIG. 6. It should be understood, however, that grooves 82, 84 could take on any size, shape and direction so long as grooves such as 82, 84 sufficiently create a relatively non-slip surface on bottom portion 78 of clamp 34.

As best illustrated in FIG. 5, grooves 82, 84 extend over about 60% of the bottom portion 78. It should be understood, however, that grooves 82, 84 may extend over any amount of length of bottom portion 78, so long as enough grooves are present to create a suitable non-slip surface.

It should further be understood that, although beveled edge 80 has not been shown with a grooved portion, one could be added, if desired.

Adjuster 36 is movable between an engaged position (FIGS. 7–8) and a disengaged position (FIG. 9) and is operably connected to the clamping member 34 for adjusting it when in the engaged position. When in the disengaged position (FIG. 9), adjuster 36 is freely movable in a vertical direction as shown by arrow 86 in FIG. 3.

The threaded adjuster 36 comprises a quick release mechanism 88 (FIGS. 7, 9). In one preferred embodiment, quick release mechanism 88 comprises sliding member 90 (FIGS. 7–9, 11) and cam 100 (FIGS. 7–9, 10), which is operatively connected to slide member 90. Sliding member 90 is movable between a first position and a second position. The sliding member 90 has a first end 92 and a second end 94, best shown in FIG. 11. The second end 94 has a portion 96 complementary to the adjuster 36 for releasably engaging the adjuster 36, and, preferably, the sliding member is spring-biased by spring 98 towards the adjuster 36. Spring 98, preferably a coil spring, effectively resiliently biases movement of the sliding member 90 toward the adjuster 36.

Cam 100 is rotatable in the direction shown by arrow 102 in FIG. 3 and arrow 104 in FIG. 9. In operation, rotation of cam 100 causes sliding member 90 to move from the first position wherein the adjuster 36 is disengaged (FIG. 9) to the second position wherein the adjuster 36 is engaged (FIGS. 7–8). When in the operable or engaged position, threads 89, 91, for example, of adjuster 36 are operatively connected to threaded portion 93, 95 adjacent thereto; adjuster 36 can then be manually rotated to effect movement of clamping member 34.

As shown in FIG. 11, sliding member 90 preferably comprises an elongated member comprising an upper and a lower surface 106, 108, respectively, and a hole 110 positioned between the two ends 92, 94 and extending between the upper surface and the lower surfaces 106, 108. Hole 110 is sized and shaped sufficiently so as to receive cam 100 which is rotatable therein.

Cam 100 can be any suitable size and shape so long as it is operative to move sliding member 90 so as to move adjuster 36 between its engaged and disengaged positions. As best shown in FIG. 10, cam 100 is preferably comprised of a lower substantially tubular member 112 having a predetermined diameter. A middle portion 114 is fixedly attached by any suitable means to the upper end of lower portion 112 and preferably has a predetermined diameter larger than the diameter of the lower member 112. Cam 100 also preferably comprises knob 116 to facilitate manual rotation thereof.

It should be understood that the quick release mechanism 88 can take on any suitable size and shape so long as adjuster 36 can be quickly and easily moved between an engaged and a disengaged position.

Referring to FIGS. 1, 3–4, clamping device 10 further comprises handle 118 removably attached to the work piece receiving member 32. Handle 118 has a longitudinal axis 120 (FIG. 1) positioned substantially perpendicularly to the direction of the reciprocating movement of the blade receiving member 16 or, in other words, substantially coaxial with the longitudinal axis 47 of the work piece receiving member 32 (FIG. 3). Handle 118 may optionally be grasped by an operator to stabilize tool 12 and handle 118 may serve to balance work piece 14 which extends beyond work piece receiving member 32.

In operation, clamping device 10 is fixedly attached to tool 12 as shown in FIGS. 1–3, for example. Work piece receiving member 32 is positioned on work surface 64 and moved into the work piece receiving position (FIG. 12). Then, adjuster 36 is moved via cam 100 to the disengaged position (FIG. 9) and a work piece 14 (FIG. 1) is positioned on work piece receiving surface 32. Afterwards, adjuster 36 is moved via rotation of cam 100 to the engaged position (FIGS. 7, 8).

Rotation of knob 101 (FIGS. 2, 6) on adjuster 36 rotates adjuster 36 so as to tighten clamping member 34 against work piece 14. After work piece 14 has been securely positioned on work piece receiving surfaces 48, 50, 52, 54, work piece receiving member 32 is rotated to the work piece beginning cutting cycle position illustrated in FIG. 13.

An operator then activates switch 22 shown in FIG. 1 so as to impart continuous reciprocating movement to blade receiving member 18 thus activating cutting blade 24. After cutting blade 24 has cut through work piece 14 in a plane substantially perpendicular to the longitudinal axis 47 of the work piece receiving member 32, work piece receiving member 32 is positioned in the work piece completing cutting cycle position, which is shown in FIG. 14.

After the work piece 14 has been desirably cut, adjuster 36 is moved via rotation of cam 100 to the disengaged position (FIG. 9) to allow the operator to quickly and easily remove work piece 14.

Advantageously, an operator may, if desired, position tool 12 with attached clamping device 10 on a relatively low work surface (not shown) for applying additional pressure to tool 12 to facilitate effecting operation on work piece 14. That is, an operator may position tool 12 with attached clamping device 10 on the floor, for example, and move it into the work piece receiving position (FIG. 12). After inserting work piece 14 therein, work piece receiving member 32 is rotated to the beginning cutting cycle position (FIG. 13). Then, the operator may, if desired, step on tool housing 16 or otherwise apply additional force on tool 12 in the appropriate direction; as such, work piece receiving member 32 rotates via rounded portion 62. The upward force of work piece receiving member 32 on work piece 14 caused by the user stepping on housing 16 facilitates movement of blade 24 through work piece 14 and toward the cutting cycle completion position (FIG. 14).

Figure 16:
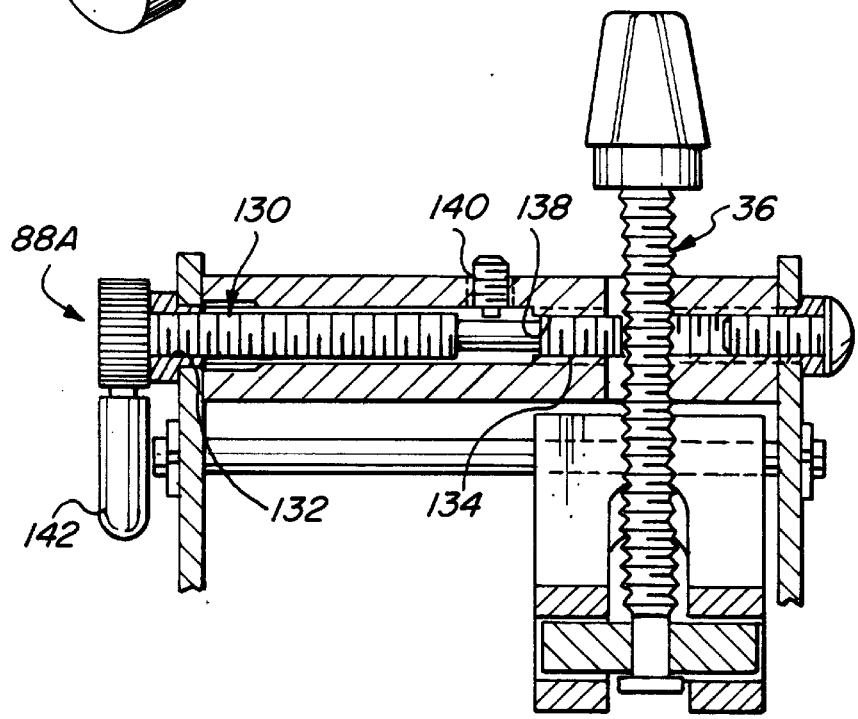
FIGS. 16–17 are cross-sectional views of the adjuster engaging member of FIG. 15, shown moving the adjuster between the engaged (FIG. 16) and disengaged (FIG. 17) positions.
Figure 17:
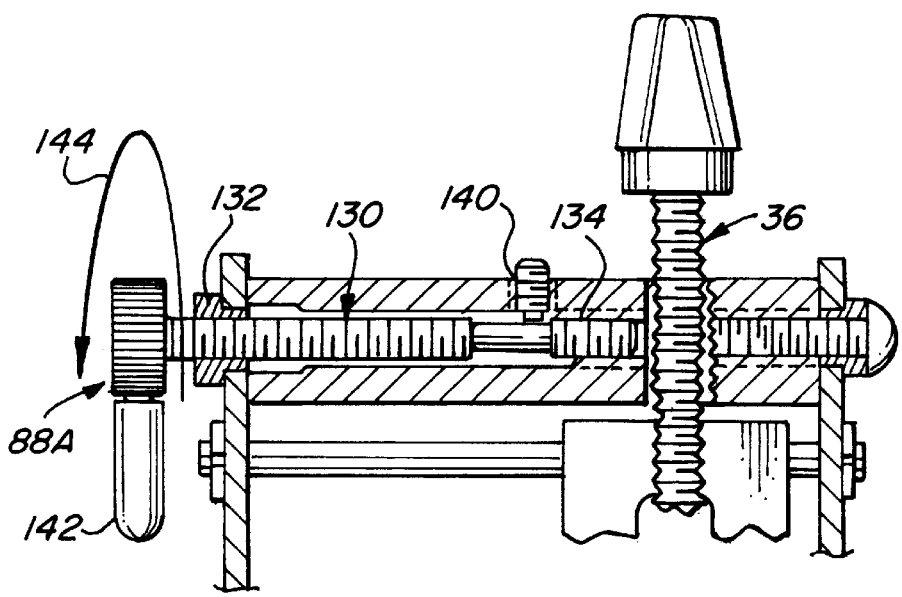

Another preferred embodiment of the quick release mechanism SBA is shown in FIGS. 15–17. Quick release mechanism 88A comprises adjuster engaging member 130, which is movable between an adjuster engaging position (FIG. 16) and an adjuster disengaging position (FIG. 17). The adjuster engaging member 130 has a first end 132 and a second end 134. The adjuster engaging member 130 has a first diameter at the first end and the second end, and a portion 136 between the first end and the second end 132, 134, respectively, having a second diameter. The second diameter is less than the first diameter.

As best shown in FIG. 15, adjuster engaging member 130 is preferably threaded at the second end 134; the threaded portion is circumferentially positioned about the adjuster engaging member 130. The housing of the work piece positioning device has an adjacent complementary threaded portion 138. The threaded portions 134, 138 cooperate to move the adjuster engaging member 130 so that it may engage (FIG. 16) and disengage (FIG. 17) the adjuster 36.

The quick release mechanism 88A further comprising a stop member 140, positioned so as to engage the first and second ends 132, 134 of the adjuster engaging member 130, so as to prevent undesired movement of the adjuster engaging member 130. That is, the stop member 140 is positioned so that the portion of the adjuster engaging member 130 having the smaller diameter slides freely thereunder; movement of the adjuster engaging member 130 is stopped in either direction when the stop member 140 abuts the portion of the adjuster engaging member 130 having the larger diameter.

As shown in FIGS. 16, 17, second end 134 of the adjuster engaging member 130 has a substantially flat surface. It should be understood, however, that this surface could have threads sized to complement the threaded portion of the adjuster 36, if desired. The other end of adjuster engaging member 130 comprises a handle 142, fixedly attached to the adjuster engaging member 130. Handle 142 is rotatable, as shown by arrow 144, for moving the adjuster engaging member 130 between the adjuster engaged (FIG. 16) and adjuster disengaged (FIG. 17) positions.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A work piece positioning device comprising:

a work piece receiving member comprising at least two receiving surfaces positioned relative to each other so as to receive and hold a work piece positioned thereon, and having a longitudinal axis;

an adjustable clamping member pivotally mounted to the work piece receiving member about a pivotal axis which is substantially parallel to the longitudinal axis of the work piece receiving member;

an adjuster movable between an engaged and disengaged position and connected to the clamping member such that when the adjuster is in the engaged position the clamping member facilitates positioning of the work piece on the work piece receiving member;

a release mechanism comprising an adjuster engaging member, movable between a first position and a second position, having a first end and a second end, for releasably engaging the adjuster and moving the adjuster between the engaged and disengaged position, at least one threaded portion, the threaded portion being circumferentially positioned about the adjuster engaging member, a first diameter at the first end and the second end, and a portion between the first end and the second end having a second diameter, the second diameter being less than the first diameter; and a complementary threaded portion, for facilitating movement of the adjuster engaging member between the first and second position.

2. The work piece positioning device of claim 1, the release mechanism further comprising a stop member, positioned so as to engage the first end and second end of the adjuster engaging member having the first diameter, so as to prevent undesired movement of the adjuster engaging member.

3. The work piece positioning device of claim 2, the second end of the adjuster engaging member having a substantially flat surface.

4. A work piece positioning device comprising:

a work piece receiving member comprising at least two receiving surfaces positioned relative to each other so as to receive and hold a work piece positioned thereon, and having a longitudinal axis;

an adjustable clamping member pivotally mounted to the work piece receiving member about a pivotal axis which is substantially parallel to the longitudinal axis of the work piece receiving member;

an adjuster movable between an engaged and disengaged position and connected to the clamping member such that when the adjuster is in the engaged position the clamping member facilitates positioning of the work piece on the work piece receiving member;

a release mechanism comprising an adjuster engaging member, movable between a first position and a second position, having a first end and a second end, for releasably engaging the adjuster and moving the adjuster between the engaged and disengaged position; and a handle removably attached to the work piece receiving member, the handle having a longitudinal axis, the longitudinal axis of the handle being substantially coaxial with the longitudinal axis of the work piece receiving member.

5. A work piece positioning device comprising:

a work piece receiving member comprising at least two receiving surfaces positioned relative to each other so as to receive and hold a work piece positioned thereon, and having a longitudinal axis;

an adjustable clamping member pivotally mounted to the work piece receiving member about a pivotal axis which is substantially parallel to the longitudinal axis of the work piece receiving member and comprising a plurality of substantially parallel grooves for facilitating positioning of the work piece;

an adjuster movable between an engaged and disengaged position and connected to the clamping member such that when the adjuster is in the engaged position the clamping member facilitates positioning of the work piece on the work piece receiving member; and a release mechanism comprising an adjuster engaging member, movable between a first position and a second position, having a first end and a second end, for releasably engaging the adjuster and moving the adjuster between the engaged and disengaged position.

6. A clamping device for positioning a work piece comprising:

a work piece receiving member comprising at least two receiving surfaces positioned relative to each other so as to receive and hold a work piece positioned thereon, and having a longitudinal axis;

an adjustable clamping member pivotally mounted to the work piece receiving member about a pivotal axis which is substantially parallel to the longitudinal axis of the work piece receiving member;

an adjuster movable between an engaged and a disengaged position and connected to the clamping member such that when the adjuster is in the engaged position, the clamping member is movable toward and away from the work piece receiving member; and a release mechanism comprising:

an adjuster engaging member, movable between a first position and a second position, having a first end and a second end, for releasably engaging the adjuster and moving the adjuster between the engaged and disengaged position, the adjuster engaging member having a first diameter at the first end and the second end, and a portion between the first end and the second end having a second diameter, the second diameter being less than the first diameter; and a stop member positioned so as to engage the first end and second end of the adjuster engaging member having the first diameter, so as to prevent undesired movement of the adjuster engaging member.

7. The clamping device for positioning a work piece of claim 6, the adjuster engaging member having at least one threaded portion, the threaded portion being circumferentially positioned about the adjuster engaging member, the work piece positioning device having a complementary threaded portion, for facilitating movement of the adjuster engaging member between the first and second position.

8. The clamping device for positioning a work piece of claim 7, the second end of the adjuster engaging member having a substantially flat surface.

9. The clamping device for positioning a work piece of claim 8, the release mechanism further comprising a handle, fixedly attached to the first end of the adjuster engaging member, for moving the adjuster engaging member between the first position and the second positions.

10. The clamping device for positioning a work piece of claim 6, further comprising a handle removably attached to the work piece receiving member, the handle having a longitudinal axis, the longitudinal axis of the handle being substantially coaxial with the longitudinal axis of the work piece receiving member.

11. The clamping device for positioning a work piece of claim 6, wherein the clamping member has a bottom portion, the bottom portion having a beveled edge for facilitating clamping a work piece.

12. A removable attachment for use with a tool, the tool comprising a housing having a blade receiving member mounted therein for continuous reciprocating movement during operation and an elongated blade of the type having a free end and a remote end, the remote end attached to the blade receiving member, the attachment comprising:

a work piece receiving member pivotally mounted to the tool housing about a pivotal axis extending substantially perpendicularly to the direction of reciprocating movement of the blade receiving member, the work piece receiving member comprising at least two receiving surfaces positioned with respect to each other so as to receive and hold a work piece positioned thereon and positioned so as to not interfere with the reciprocating movement of the cutting blade;

an adjustable clamping member pivotally mounted to the work piece receiving member about a pivotal axis extending substantially perpendicularly to the direction of the reciprocating movement of the blade receiving member;

an adjuster, movable between an engaged and a disengaged position and connected to the clamping member such that when the adjuster is in the engaged position the clamping member facilitates positioning of the work piece on the work piece receiving member;

a detachable mounting assembly for detachably mounting the work piece receiving member to the tool housing; and a release mechanism comprising an adjuster engaging member, movable between a first position and a second position, having a first end and a second end, for releasably engaging the adjuster and moving the adjuster between the engaged and disengaged position.

13. The removable attachment of claim 12, the adjuster engaging member having at least one threaded portion, the threaded portion being circumferentially positioned about the adjuster engaging member, the work piece positioning device having a complementary threaded portion, for facilitating movement of the adjuster engaging member between the first and second position.

14. The removable attachment of claim 13, the adjuster engaging member having a first diameter at the first and the second end, and a portion between the first and the second end having a second diameter, the second diameter being less than the first diameter.

15. The removable attachment of claim 14, the release mechanism further comprising a stop member, positioned so as to engage the first and second ends of the adjuster engaging member having the first diameter, so as to prevent undesired movement of the adjuster engaging member.

16. The removable attachment of claim 15, the second end of the adjuster engaging member having a flat surface.

\* \* \* \* \*

UNITED STATES PATENT AND TRADEMARK OFFICE
CERTIFICATE OF CORRECTION

PATENT NO. : 5,806,187

DATED : September 15, 1998

INVENTOR(S) : Lucien C. Ducret

It is certified that error appears in the above-identified patent and that said Letters Patent is hereby corrected as shown below:

At Column 8, line 48 "SBA" should be replaced with --88A--.

Signed and Sealed this

Twenty-second Day of December, 1998

Attest:

BRUCE LEHMAN

Attesting Officer

Commissioner of Patents and Trademarks